(12) United States Patent
Ha

(10) Patent No.: US 12,151,551 B2
(45) Date of Patent: Nov. 26, 2024

(54) ACTUATION MECHANISM FOR ACTUATING THE CLOSURE DEVICES OF AN AIR FLOW CONTROL ASSEMBLY OF A VEHICLE

(71) Applicant: HBPO GMBH, Lippstadt (DE)

(72) Inventor: Insoo Ha, Erwitte (DE)

(73) Assignee: HBPO GmbH, Lippstadt (DE)

( * ) Notice: Subject to any disclaimer, the term of this patent is extended or adjusted under 35 U.S.C. 154(b) by 259 days.

(21) Appl. No.: 17/997,111

(22) PCT Filed: Apr. 22, 2021

(86) PCT No.: PCT/EP2021/060527
§ 371 (c)(1),
(2) Date: Oct. 25, 2022

(87) PCT Pub. No.: WO2021/219485
PCT Pub. Date: Nov. 4, 2021

(65) Prior Publication Data
US 2023/0166592 A1 Jun. 1, 2023

(30) Foreign Application Priority Data
Apr. 29, 2020 (DE) ...................... 10 2020 111 714.0

(51) Int. Cl.
*B60K 11/08* (2006.01)
(52) U.S. Cl.
CPC .................................. *B60K 11/085* (2013.01)
(58) Field of Classification Search
CPC ........... B60K 11/085; Y02T 10/88; F01P 7/10
See application file for complete search history.

(56) References Cited

U.S. PATENT DOCUMENTS 5,141,026 A * 8/1992 Collette .................... F01P 7/10
251/229
5,738,179 A * 4/1998 Matsui .................. B62D 25/10
180/69.21
(Continued)

FOREIGN PATENT DOCUMENTS

DE 202011050523 U1 10/2011
DE 102017219420 A1 5/2019
(Continued)

OTHER PUBLICATIONS

WIPO, International Search Report (in parent application), Jul. 29, 2021.

*Primary Examiner* — Kurt Philip Liethen
(74) *Attorney, Agent, or Firm* — Laurence P. Colton; Smith Tempel Blaha LLC

(57) ABSTRACT

An actuation mechanism for at least partially asynchronously actuating two closure devices of an air flow control assembly for a vehicle, comprising a control element that is/can be connected to an actuator. This is operatively connected via a first coupling part provided for actuating the first closure device and via a second coupling part provided for actuating the second closure device in such a way that a movement of the control element occurring about an axis of rotation can be converted into a shifting of the two coupling parts via a slide controller having corresponding control pins and bearing grooves. The control element having the control pins is integrated at least partially between the two coupling parts which are at least partially overlapping and can be shifted relative to the control element. The control pins engage at least partially into the bearing grooves positioned on the coupling parts.

14 Claims, 9 Drawing Sheets

(56) References Cited

U.S. PATENT DOCUMENTS

| | | | |
|---|---|---|---|
| 8,733,484 B1 | 5/2014 | Klop | |
| 8,915,320 B2 * | 12/2014 | Chinta | B60K 11/085 180/68.1 |
| 9,168,827 B2 * | 10/2015 | Povinelli | B60K 11/085 |
| 10,207,578 B2 | 2/2019 | Cosmo | |
| 10,421,352 B2 | 9/2019 | Urbach | |
| 2017/0050510 A1 * | 2/2017 | Manhire | B60R 19/52 |
| 2018/0170170 A1 | 6/2018 | Nam | |
| 2020/0269679 A1 * | 8/2020 | Guyon | B60H 1/242 |
| 2023/0077641 A1 * | 3/2023 | Byun | B60K 11/085 296/180.5 |

FOREIGN PATENT DOCUMENTS

| | | |
|---|---|---|
| DE | 102017222678 A1 | 6/2019 |
| GB | 2515640 A | 12/2014 |

* cited by examiner

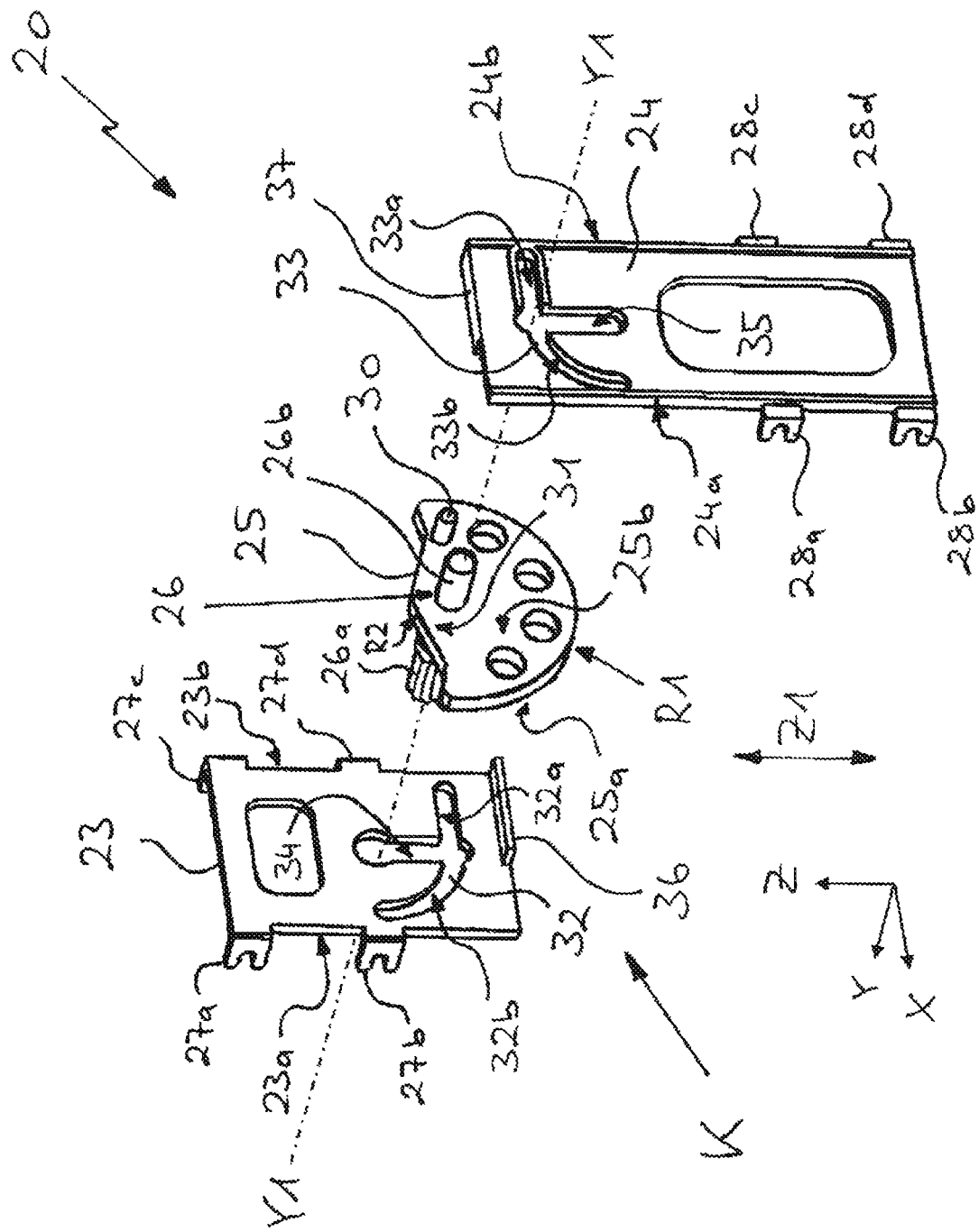

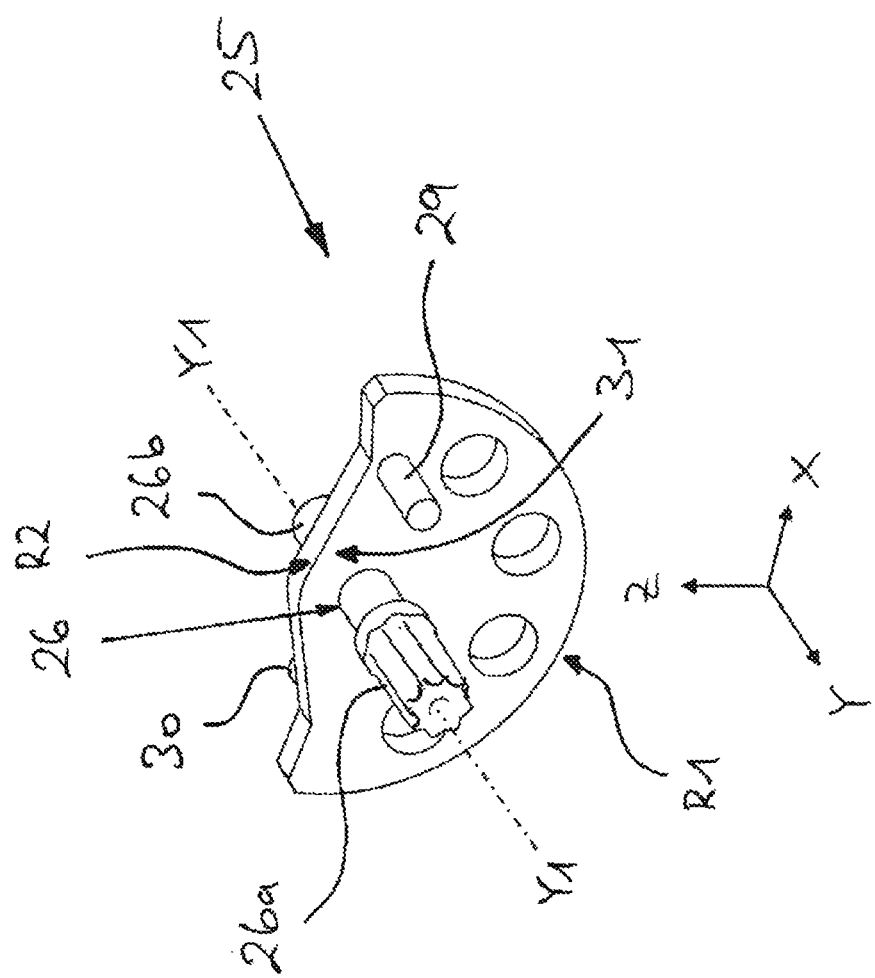

ACTUATION MECHANISM FOR ACTUATING THE CLOSURE DEVICES OF AN AIR FLOW CONTROL ASSEMBLY OF A VEHICLE

CROSS REFERENCE TO RELATED APPLICATIONS

This application is the US National Phase of and claims the benefit of and priority on International Application No. PCT/EP2021/060527 having a filing date of 22 Apr. 2021, which claims priority on and the benefit of German Patent Application No. 10 2020 111 714.0 having a filing date of 29 Apr. 2020.

BACKGROUND OF THE INVENTION

Technical Field

The invention relates to an actuation mechanism for at least partially asynchronous actuation of two closure devices of an air flow control assembly for a vehicle, comprising a control element which is or can be connected to an actuator and which is operatively connected via a first coupling part provided for actuating the first closure device and via a second coupling part provided for actuating the second closure device, in such a way that a movement of the control element occurring about an axis of rotation can be converted into a shifting of the two coupling parts via a slide controller having mutually corresponding control pins and bearing grooves. Furthermore, the invention relates to an air flow control assembly for a vehicle having such an actuation mechanism comprising two closure devices which are coupled to such an actuation mechanism.

Prior Art

The flow resistance coefficient or drag coefficient (cw value) of a motor vehicle, which acts on the energy consumption in particular at higher speeds, depends largely upon the "streamlining" of said vehicle. Further improvements can result from the temporary closing of the vehicle openings required for introducing air. For this purpose, air flow control assemblies located at the front end have already been long established. As a result of the arrangement thereof upstream of at least one component, the action of air thereon, flowing in during a movement of the vehicle, can be actively controlled. Typically, components such as heat exchangers and/or cooling elements can be supplied with flowing air in this way in order to ensure, for example, the cooling of the engine, the vehicle interior, and/or an accumulator. With increasing closing of the airflow regulation assembly, the proportion of turbulence resulting from the opening(s) can be reduced, such that an advantageous smoothing of the flow acting on the vehicle can be achieved. As a result, the air is deflected in an improved manner via the shape of the vehicle. Particularly when using internal combustion engines, the pollutant emission thereof can also be reduced in this way. Moreover, such an air flow control assembly can be used even at low speeds, in order to accelerate the heating process of a drive by a corresponding reduction of the air flow.

Modern vehicle designs often have two air inlets located one above the other, the air passage of which is changed as required, either simultaneously or separately from one another, by means of an air flow control assembly. The air flow control assembly used for this purpose has two closure devices, of which each closure device is associated with one of the two air inlets, respectively. Each closure device has at least one lamella, by means of pivoting which the cross-section of the respective air passage can be changed. The separate actuation of the two closure devices is often realized by the use of two actuators. Variants that are more economical and are of a more lightweight construction manage with just one actuator, which is then coupled to both closure devices via a suitable linkage, for example.

For example, DE 10 2017 219 420 A1 describes an air flap device having a frame assembly which delimits an opening portion. The air flap device serves for arrangement on a motor vehicle in order, for example, to control the inflow of cooling air for a heat exchanger which can be acted upon thereby. The frame assembly is divided into a first frame portion and a second frame portion extending the opening portion to a channel. At least one lamella that is pivotably mounted on the frame assembly makes it possible to change the opening cross-section of the air flap device, through which air can flow, in the individual driving states. In order to achieve the tightest possible connection to the surrounding components of the respective motor vehicle, the second frame portion is composed of individual frame elements which are arranged pivotably on the first frame portion.

U.S. Pat. No. 10,207,578 B2 discloses a closure system for a radiator grille of a motor vehicle which comprises a multipart frame. The frame defining an opening portion has an upper frame portion and, spaced apart in parallel thereto, a lower frame portion, the ends of which are each connected to one another via one of two end caps. An engine housing containing an actuator is arranged in the middle of the frame thus formed, from which housing several lamellae extend on both sides, as far as the two end caps. Due to the rotatable mounting of the lamellae, the angle of incidence thereof can be changed via the actuator. The parts of the frame which can be connected to one another via plug-in connections, and the engine housing which can likewise be plugged onto the frame, enable disassembled transport of the closure system. Frame portions of different lengths allow a modular adaptation of the closure system to the available installation dimensions of the respective motor vehicle. Using two frames makes it possible for two opening portions arranged one above the other to be delimited, wherein the lamellae serving for their closure are actuatable by means of a single actuator. For this purpose, a linkage arranged between the two frames transmits the actuating forces, acting on the lamellae mounted on one of the frames by means of the actuator, to the lamellae mounted on the other frame.

U.S. Pat. No. 8,733,484 B1 discloses a further closure system for a radiator grille of a motor vehicle. This comprises two opening portions, each of which is associated with a lamella group. The first lamella group is coupled to an actuator, while the second lamella group is operatively connected to the first lamella group via a linkage. The lamella groups are designed to be pivoted from a closed position into a position that is open in relation thereto. For this purpose, the setting of the lamellae of the first lamella group can be changed by the actuator and transmitted via the linkage to the lamellae of the second lamella group. In order to compensate for any manufacturing differences, the linkage has a compensating spring in order to prevent the actuator from being switched off prematurely on account of the resistance that occurs in the event of the closed position of one of the lamella groups being reached in a non-uniform manner.

DE 10 2017 222 678 A1 and U.S. Pat. No. 10,421,352 B2 also disclose closure systems for a radiator grille of a motor vehicle. In contrast to the aforementioned systems, these enable mutually independent actuation of the two lamella groups. For this purpose, a control element, which is rotatable via an actuator, is provided in the form of a drum, which has two grooves arranged in the lateral surface thereof. The lamella groups are each operatively connected to the control element via a longitudinally slidable coupling part, wherein each coupling part engages in one of the two grooves via a control pin. With changes in direction, successive straight portions of the respective groove form a slide controller, such that a rotation of the control element causes a corresponding shift of the control pins and the coupling parts connected thereto. Due to the course of the two grooves relative to one another, the lamella groups can in this case assume four different combinations of operating positions, in which the two lamella groups are closed or opened, either simultaneously or alternately in each case.

Above all, the assemblies having just one actuator enable a design which is as compact as possible, as well as lightweight and ultimately economical as a whole. The always synchronous actuation of both closure devices correspondingly limits the effect that can be achieved thereby. In contrast, an at least partially asynchronous, i.e., either completely alternating or simultaneous only to a limited extent, actuation of the closure devices offers advantages. Taking into account the wind load acting on the closure devices in particular at higher speeds, the mechanism used in this case must be able to transmit sufficiently high forces to ensure the pivoting and the maintenance of the position, which can be assumed in this way, of the lamellae thereof.

BRIEF SUMMARY OF THE INVENTION

Against this background, the object of the invention is to develop a control mechanism serving for at least partially asynchronous actuation of two closure devices of an air flow control assembly, as well as an air flow control assembly equipped therewith for a vehicle, such that, in addition to an economic design, they enable the most robust and compact design possible.

This object is achieved by an actuation mechanism for at least partially asynchronously actuating two closure devices of an air flow control assembly for a vehicle, comprising a control element which is or can be connected to an actuator and which is operatively connected via a first coupling part provided for actuating the first closure device and via a second coupling part provided for actuating the second closure device, in such a way that a movement of the control element occurring about an axis of rotation can be converted into a shifting of the two coupling parts via a slide controller having mutually corresponding control pins and bearing grooves, characterized in that the control element having the control pins is integrated at least partially between the two coupling parts which are at least partially overlapping and can be shifted relative to the control element, wherein the control pins engage at least partially into the bearing grooves positioned on the coupling parts, and an air flow control assembly for a vehicle, comprising two closure devices which are coupled to an actuation mechanism (20) as described herein. The respective dependent claims relate to advantageous developments.

According to the invention, an actuation mechanism for at least partially asynchronous actuation of two closure devices of an air flow control assembly for a vehicle is provided, which comprises a control element which is or can be connected to an actuator. The control element is operatively connected via a first coupling part provided for actuating the first closure device. Furthermore, the control element is operatively connected via a second coupling part provided for actuating the second closure device. These connections cause a movement of the control element, occurring about an axis of rotation, to be converted by a slide controller into a shifting of the two coupling parts. For this purpose, the slide controller itself has control pins and bearing grooves which correspond to one another. According to the invention, the control pins are located on the control element, while the bearing grooves are located on the coupling parts. The control element is integrated between the two coupling parts, which are at least partially overlapping and can be shifted relative to the control element, in such a way that the control pins of the control element engage at least partially into the bearing grooves of the coupling parts.

The resulting advantage lies in an extremely compact design of the actuation mechanism according to the invention. Actuating forces originating from the actuator are thus transmittable to the two closure devices—in particular, one after the other—over the shortest possible path. This results in economic advantages, since the controllable surface is increased, and the actuating forces originating from the actuator are limited. Conversely, the wind loads acting on the closure devices—in particular, at high speeds—can also be supported over a short path, without disadvantageous spring properties resulting due to long and in this respect less rigid components or/and the "riding" brought about by the forces to be absorbed in the process. Such wind loads can furthermore also be absorbed in a divided manner via the actuator. Furthermore, overall larger wind loads can thus also be absorbed, if controllable surfaces and actuating forces originating from the actuator remain unchanged. Overall, it is thus possible to divide the actuating forces of the actuator, and thus to increase the control surface and the absorbable wind load or the maximum flow rate or, vice versa, to dimension the actuator so as to be smaller, i.e., having lower actuating forces.

According to a preferred development of the basic concept of the invention, the control pins of the control element can be arranged so as to be offset relative to a longitudinal direction of the axis of rotation of said control element. Furthermore, in this case, the control pins can be arranged on sides, facing away from one another, of the control element. In this way, the control element, incorporated between the two coupling parts, is in operative engagement with the bearing grooves of the coupling parts on both sides, via its control pins. Due to the immediate vicinity of these components to one another, an overall rigid and precise actuation of the coupling parts is achieved via the control element. The correspondingly small length of the control pins enables the transmission of even high forces. Resilient behavior, undesired in this case, or even structural failure due, in particular, to dynamic overload, is thus largely excluded.

Advantageously, the two control pins of the control element can extend away from one another in a plane intersecting the axis of rotation of said control element. In other words, the control pins and the axis of rotation lie together on the imaginary plane. Particularly in the case of an identical spacing of the relevant control pin from the axis of rotation, an ideal balance of the forces with respect to the bearing of the control element via its axis of rotation is established.

With regard to the extension of the bearing grooves of the coupling parts, designed for receiving one of the control pins in each case, various designs are conceivable. As part of the slotted guide, its course is decisive for the start and the end of the shifting of the coupling parts, as well as their behavior in-between, as soon as the control element performs a rotational movement excited by the actuator. Preferably, the bearing groove of each coupling part can have a straight portion and a curved portion adjoining it. Advantageously, the value of a radius of the curved portion can correspond to the value of a distance of the associated control pin from the axis of rotation, in relation to the respective longitudinal direction thereof. As a result, it is possible for the associated control pin to pass through the curved portion of the bearing groove of the associated coupling part during a rotation of the control element, without said coupling part being shifted. In contrast, the straight portion of the bearing groove adjoining the curved portion can be arranged such that the control pin runs onto an edge defining the straight portion, when the straight portion is reached, and is supported on the control element, as the rotation of said control element increases, in such a way that the associated coupling part is forced out of its position—in particular, linearly. In this way, the curved portions of the coupling parts can form those regions of the bearing grooves in which no reaction with respect to a shift of the coupling parts results when the control pin passes through the rotating control element. In contrast, the straight portions of the coupling parts can form those regions of the bearing grooves in which a shift of the coupling parts results due to the control pins running onto the edges thereof that limit said pins.

By means of a targeted arrangement of the bearing grooves, formed in this way, on or in the coupling parts, it is possible for only one of the coupling parts to be shifted at the beginning of a rotation of the control element (control pin is located in the straight portion of the associated bearing groove), while the other coupling part, in each case, remains in its position (control pin is located in the curved portion of the associated bearing groove). With further rotation, the shifting of the initially still moving coupling part can now end (control pin runs out of the straight portion into the curved portion of the associated bearing groove), while the shifting of the hitherto stationary coupling part begins (control pin runs out of the curved portion into the straight portion of the associated bearing groove).

According to a further possible embodiment of the bearing grooves located in or on the coupling parts, said grooves can be arranged such that the curved portion of the bearing groove of the first coupling part and the curved portion of the bearing groove of the second coupling part are curved in a manner contrary to one another. With reference to the overlapping arrangement of the two coupling parts, the curved portions of their bearing grooves can theoretically supplement a common curved portion, provided that the two coupling parts lie one above the other such that the ends of the two curved portions of their bearing grooves are aligned with one another.

In principle, the invention provides that the coupling parts, which are linearly shiftable with respect to a shifting direction, each be able to have a guide groove extending in parallel with the shifting direction. The axis of rotation then has two axis portions, each located on one of the sides, facing away from one another, of the control element, which axis portions point away from one another. In this case, the axis portions each extend through the guide groove of the associated coupling part, at least in portions. In this way, it is possible for the axis of rotation, which protrudes, by its axis portions, from both sides of the control element, to extend through the guide grooves of the two coupling parts. The course of the guide grooves enables the shifting of the coupling parts relative to the control element, in that the two axis portions of the axis of rotation of said control element each pass through the guide groove of the associated coupling part.

In this connection, it is provided that the guide groove of each coupling element be able to intersect the associated bearing groove. In other words, the guide groove and the bearing groove of each coupling element can form a common pattern. Particularly preferably, the guide groove of a coupling part can intersect the associated bearing groove in a transition region between a straight portion and a curved portion of said bearing groove.

The control element can function as a pure carrier of the control pins, such that the two coupling parts, which engage with the control pins via their bearing grooves, can be supported solely by the control pins on the control element. In order to ensure sufficient support—particularly in the possible end positions of the shiftable coupling parts and/or in a position of a control pin in the associated bearing groove that does not serve for support—at least one of the coupling parts can then also be supported directly on the control element. Thus, the control element can have at least one cam disk or be at least partially designed as such. Furthermore, at least one of the coupling elements can have a projection, via which the associated coupling element can then be supported on an outer edge of the cam disk—in particular, in a corresponding position of the coupling element and of the control element relative to one another.

Depending upon the provided type of connection of the two coupling elements to the lamellae of closure devices of an air flow control assembly, it may be necessary for a shifting of the coupling parts transverse to the longitudinal direction of the axis of rotation of the control element, which is possible in operation, to be able to be compensated for without loss of functionality. For this reason in particular, the axis portions of the axis of rotation and the control pins can each be of such a length as to extend through the associated bearing grooves and guide grooves, even in the case of a change in the distance between the coupling elements transverse to the shifting direction occurring at the same time as the linear shifting of the coupling elements with respect to the shifting direction. If at least one of the coupling elements has a projection, as discussed above, in combination with a cam disk, its projecting length can, of course, also be selected such that it can be supported at least in part on an outer edge of the cam disk, even when the distance between the coupling elements is changed.

Within the scope of the invention, it is considered advantageous if each coupling element has at least one extension on its opposing edges, which extension is designed for articulated connection to a pivotable lamella of an associated closure device. In this way, the coupling elements offer the possibility of a direct connection to the lamellae, so that the linear shifting ability of the coupling elements can be converted directly into an actuation of the lamellae.

The actuation mechanism, according to the invention, that is now presented enables an extremely compact, and at the same time robust, design of an actuation mechanism for the closure devices of an air flow control assembly. In particular, the deliberately short paths for the transmission of occurring forces from the actuation and pending wind loads guarantee an operation of the closure devices that is always precise and highly resilient.

Furthermore, the invention is directed at an air flow control assembly for a vehicle. The air flow control assembly comprises two closure devices which are coupled to an actuation mechanism according to the invention.

The advantages resulting from this have already been explained in more detail in connection with the actuation mechanism according to the invention, so that, in order to avoid repetition, reference is made at this point to the previous explanations in this regard.

Preferably, the two closure devices can be arranged in a base frame, which is, in particular, substantially rectangular. Each of the closure devices has at least one lamella which is movably supported, at least via one of its two end portions, on the base frame.

In this connection, it is considered advantageous if the base frame has a central strut, in and/or on which an actuator is fixed. An output of the actuator can thus be connected in a torque-transmitting manner to one of the two axis portions of the axis of rotation of the control element of the actuation mechanism. For this purpose, the output and the axis portion can have mutually corresponding contours, which then engage with one another in an advantageous manner.

According to a preferred development of the air flow control assembly according to the invention, the base frame thereof can be divided by at least one wall element. The base frame can thus have a first passage region having the first closure device, and a second passage region having the second closure device. For this purpose, the at least one wall element can extend between two, opposite side profiles of the base frame. Alternatively, the division can take place via two wall elements which can then each extend from one of the side profiles to a central strut, located between the two side profiles, of the base frame.

In order to stabilize the mounting of the control element of the actuation mechanism in particular, it is considered particularly advantageous if the air flow control assembly has a retainer suitable for this purpose. The retainer is designed in such a way that the axis portion, connected to the actuator, of the axis of rotation of the control element is mounted on the corresponding output of the actuator, while the axis portion, facing away from the actuator, of the axis of rotation of the control element is rotatably mounted on the retainer. In this way, the control element is supported by the two axis portions of its axis of rotation, such that precise guidance of the control element results. For this purpose, the retainer can have, for example, three arms, which can each be fixed to one or two wall element(s) and a central strut of the base frame.

BRIEF DESCRIPTION OF THE DRAWINGS

The invention is explained in more detail below with reference to an embodiment schematically illustrated in the individual drawings. In the drawings:

FIG. 6 is an exploded view of the actuation mechanism in an orientation according to FIG. 4;

FIG. 7 is a perspective view of a single, isolated component of the actuation mechanism from FIG. 5 and FIG. 6;

DETAILED DESCRIPTION OF PREFERRED EMBODIMENTS

Figure 1:
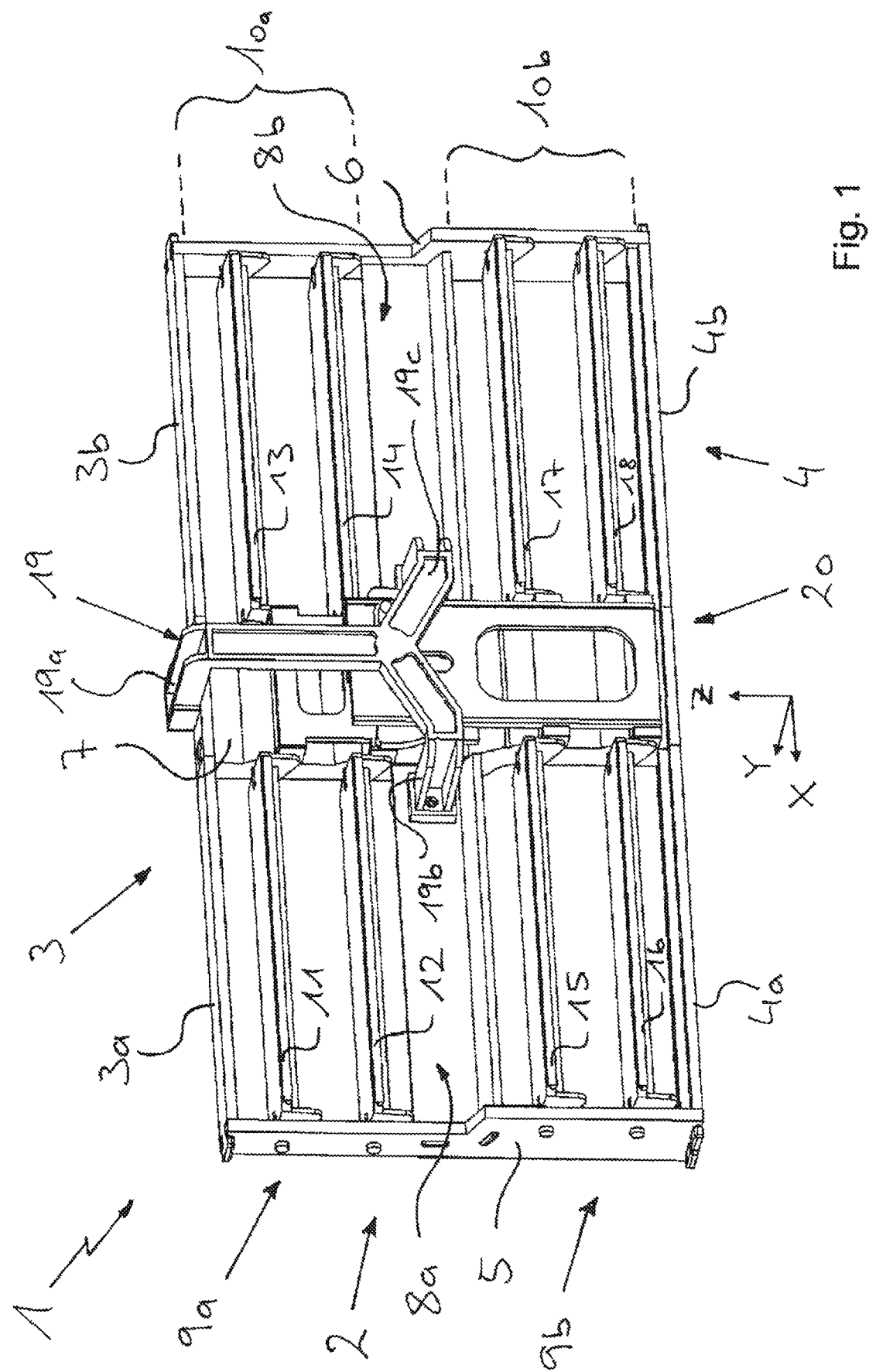
FIG. 1 is a first perspective view of an air flow control assembly according to the invention.

FIG. 1 is a perspective view of an air flow control assembly 1 according to the invention. This has a base frame 2, which is in this case, purely by way of example, rectangular in design, and has two longitudinal profiles 3, 4 which are spaced apart from one another and extend in parallel with a longitudinal direction X, and are connected via two side profiles 5, 6, which are likewise spaced apart from one another and extend in parallel with a vertical direction Z. A central strut 7 of the base frame 2, which extends, in parallel with the vertical direction Z, between the two longitudinal profiles 3, 4, is located between the two side profiles 5, 6.

In the embodiment shown here, each of the two longitudinal profiles 3, 4 is divided, purely by way of example, into two longitudinal profile portions 3a, 3b; 4a, 4b, each extending between one of the side profiles 5, 6 and the central strut 7. A wall element 8a, 8b, which extends in parallel with the longitudinal direction X, is located in each case between two longitudinal profile portions 3a, 4a; 3b, 4b, in each case, located with their longitudinal sides opposite one another. The base frame 2 is divided into two passage regions 9a, 9b by the two wall elements 8a, 8b; more precisely, into a first passage region 9a and a second passage region 9b. In this case, the first passage region 9a, located at the top in FIG. 1, is delimited by the two longitudinal profile portions 3a, 3b of the first longitudinal profile 3, located at the top in FIG. 1, and the two wall elements 8a, 8b, as well as a part of the two side profiles 5, 6 in each case. In contrast, the second passage region 9b, located below the first passage region 9a in FIG. 1, is delimited by the two longitudinal profile portions 4a, 4b of the second longitudinal profile 4, located at the bottom in FIG. 1, and the two wall elements 8a, 8b, as well as a part of the two side profiles 5, 6 in each case.

In order to be able to change the two passage regions 9a, 9b with respect to their opening cross-section, a first closure device 10a is arranged in the first passage region 9a, while a second closure device 10b is arranged in the second passage region 9b. In the example shown here, each closure device 10a, 10b has four lamellae 11 through 14, 15 through 18, respectively, each of which is movably supported, via the end portion thereof facing away from the central strut 7, on the side profiles 5, 6 of the base frame 2. In contrast, the end portions, facing away from the side profiles 5, 6, of the lamellae 11 through 14, 15 through 18 are movably supported on the central strut 7. An actuation mechanism 20 according to the invention, which is described in more detail at another point with reference to FIGS. 4 through 7, is located between the central strut 7 and a retainer 19, which has a total of three arms 19a, 19b, 19c in the example shown here and is spaced apart from the central strut 7 with respect to a transverse direction Y. The retainer 19 is fixed, by its first arm 19a, on the central strut 7, in the region of the first longitudinal profile 3, while the other arms 19b, 19c are each connected to one of the two wall elements 8a, 8b.

Figure 2:
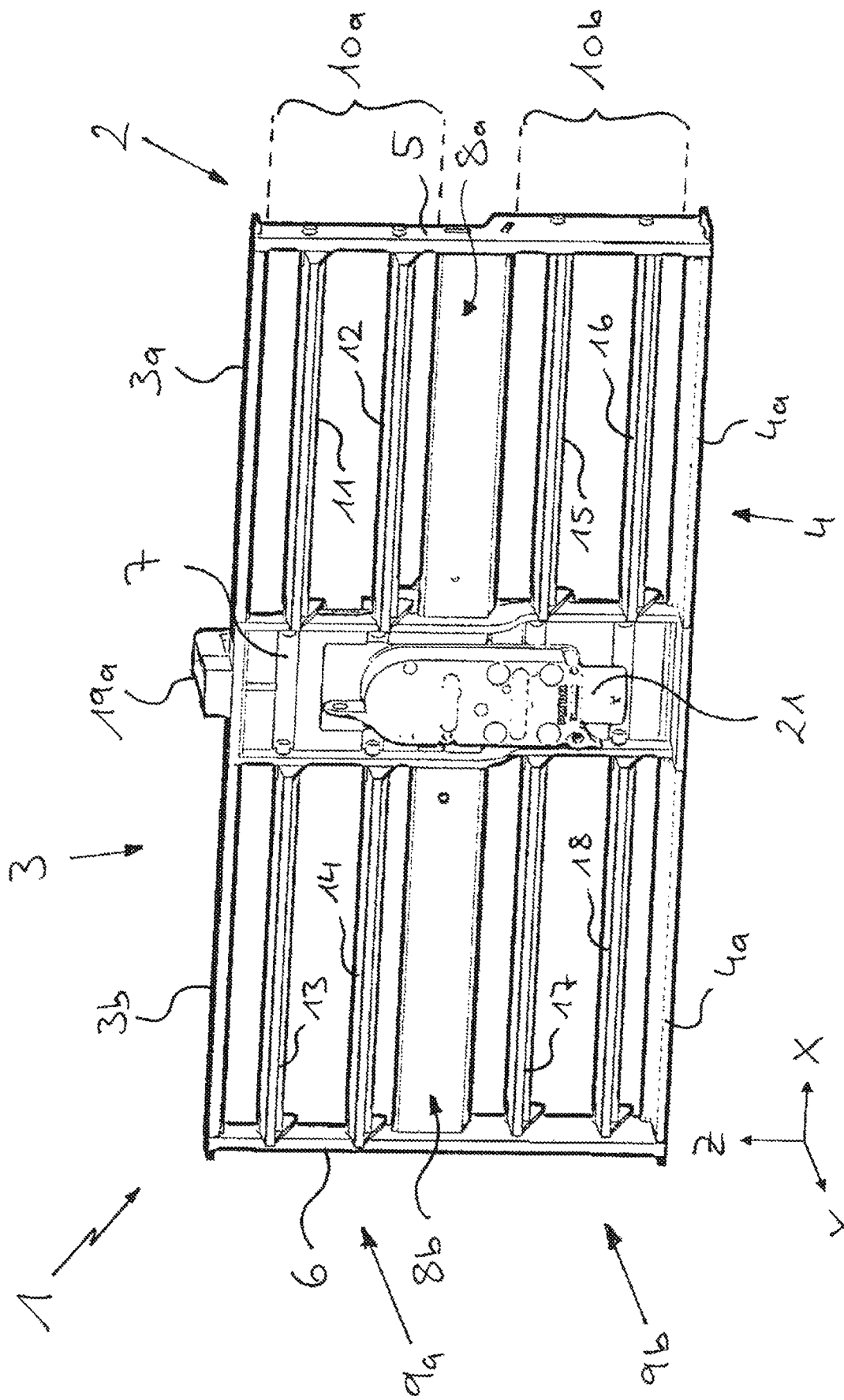
FIG. 2 is the same view of the air flow control assembly from FIG. 1 from its other side.

FIG. 2 is a perspective view of the air flow control assembly 1 of FIG. 1 from the other side. It can be seen from this that an actuator 21 is fixed to the central strut 7.

Figure 3:
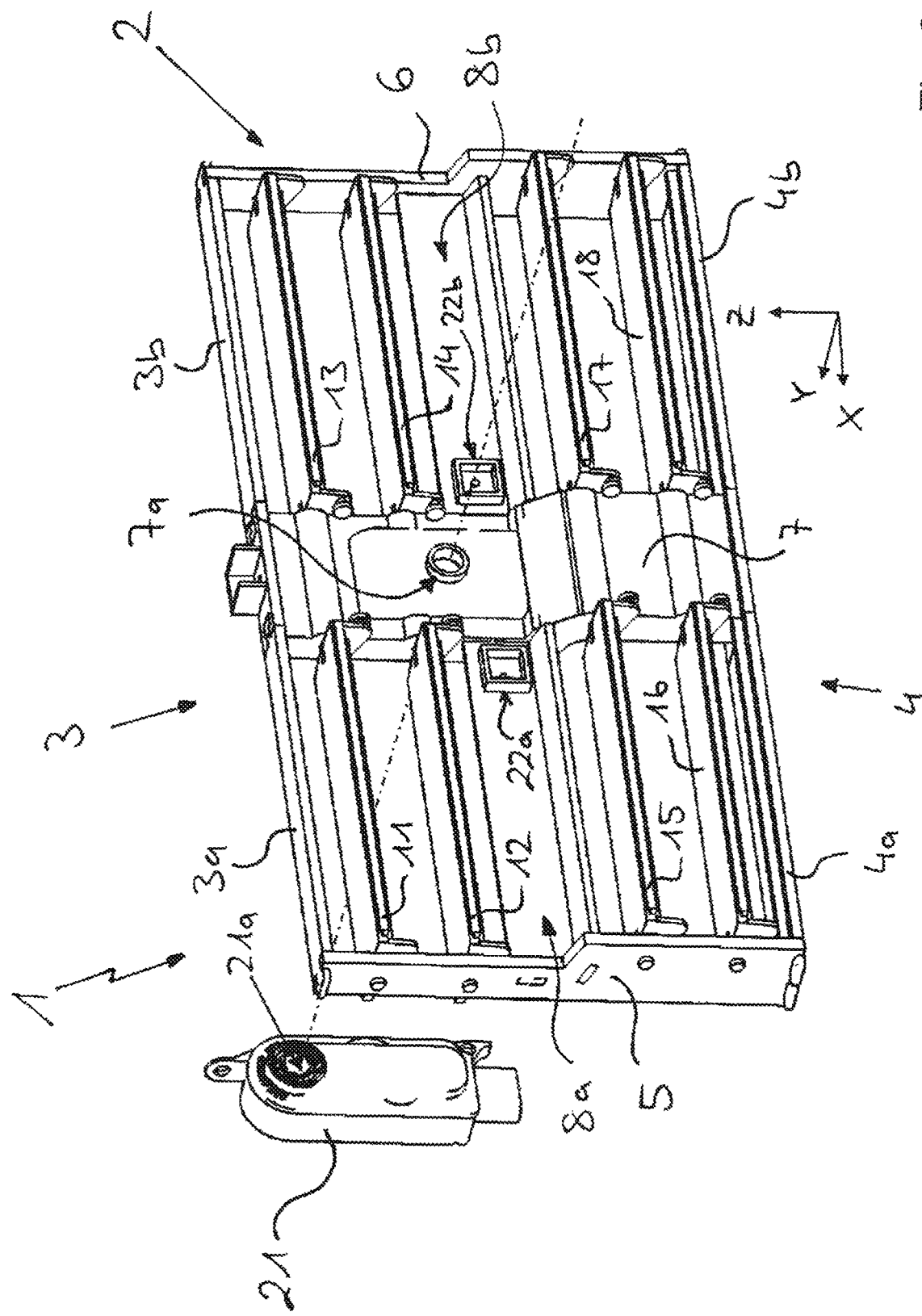
FIG. 3 is the view from FIG. 1 of the air flow control assembly, in a partially disassembled state.

FIG. 3 again shows the air flow control assembly 1 in the illustration as in FIG. 1. In contrast to FIG. 1, the retainer 19 and the actuation mechanism 20 have been removed here in order to obtain a free view of the configuration of the central strut 7. As can be seen, the said strut has a passage opening 7a, which corresponds to an output 21b of the actuator 21, shown removed from the base frame 2, in the form of an exploded view (indicated by dashed lines). Bases 22a, 22b, which are arranged on the two wall elements 8a, 8b and are designed for connection to the two arms 19b, 19c of the retainer 19, are furthermore visible. A further base 22c, which serves to connect to the last arm 19a of the retainer 19, is also at the upper end of the central strut 7, in the region of the first longitudinal profile 3.

Figure 5:
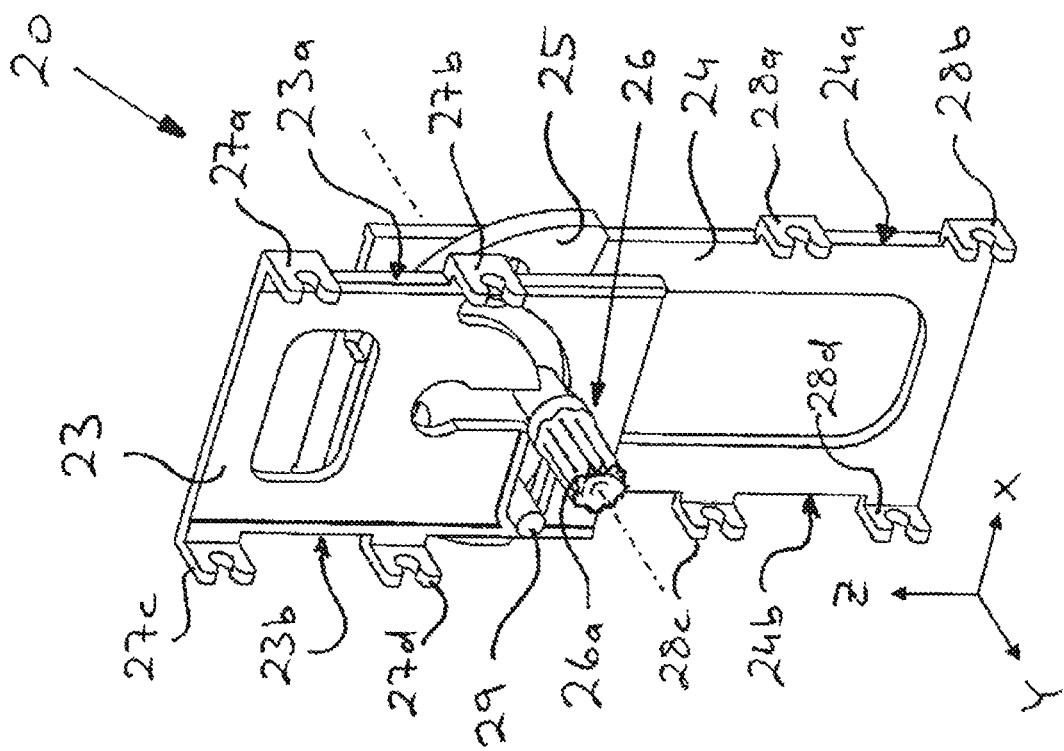
FIG. 5 is the same view of the actuation mechanism from FIG. 4 from its other side.
Figure 4:
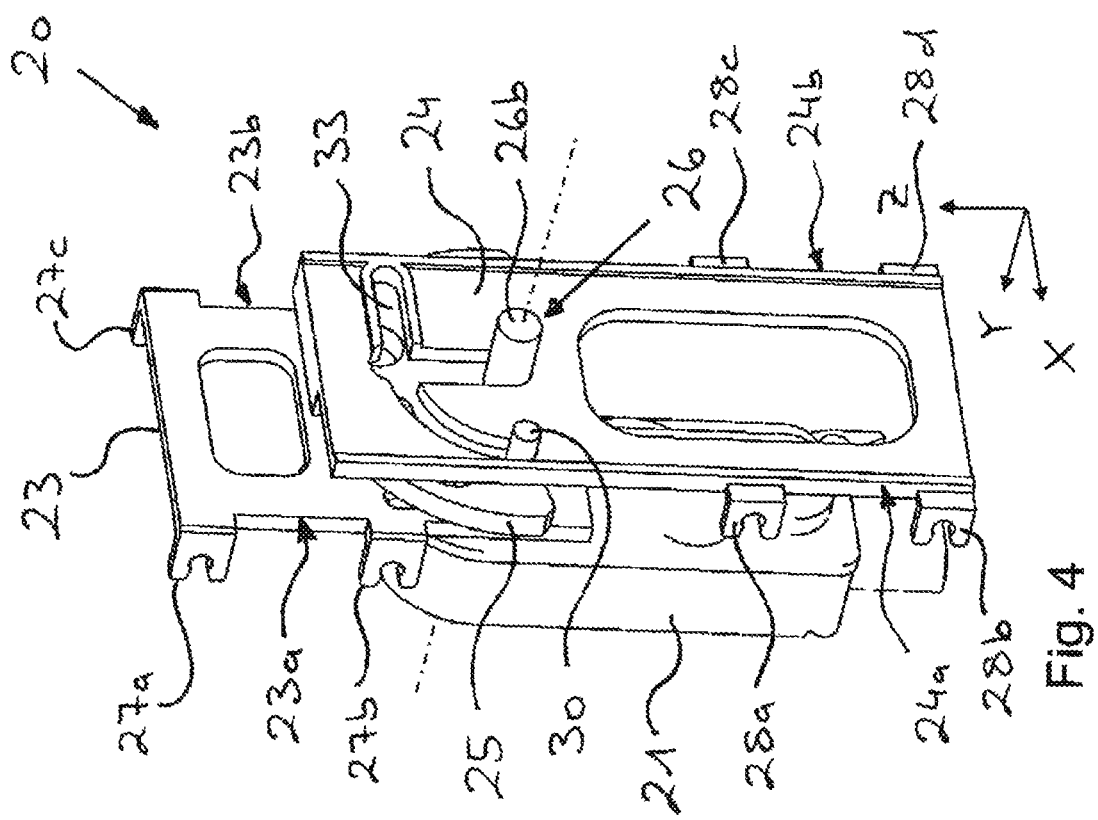
FIG. 4 is a perspective view of an actuation mechanism according to the invention.

FIG. 4 and FIG. 5 illustrate the design of the actuation mechanism 20 according to the invention, which is shown for this purpose in a detached form in each case. Said mechanism comprises two coupling parts 23, 24, the cover sides of which overlap at least in regions and between which a control element 25 is integrated. The control element 25 has a structural axis of rotation 26 which extends in parallel with the transverse direction Y and is divided into two axis portions 26a, 26b which face away from one another. FIG. 5 shows that a first axis portion 26a of the axis of rotation 26 has a contour which corresponds, in a manner not shown in detail, to a contour of the output 21a of the actuator 21. In order to indicate the connection between the output 21a and the first axis portion 26a of the axis of rotation 26, which connection can transmit torque by way of the contours, the position of the actuator 21, normally fixed on the central strut 7 of the base frame 2 (not shown here), is again indicated in FIG. 4. The second axis portion 26b of the rotational axis 26, which is remote from the first axis portion 26a and, in this respect, also the actuator 21, is designed, in a manner not shown in greater detail here, to be mounted rotatably in a corresponding receptacle of the retainer 19 (not shown here) (see FIG. 1).

As already illustrated with reference to FIG. 1, the two coupling parts 23, 24 serve to actuate the two closure devices 10a, 10b. Specifically, in this case, the first coupling element 23 serves to actuate the first closure device 10a, while the second coupling element 24 enables the actuation of the second closure device 10b. For this purpose, two extensions 27a, 27b; 27c, 27d; 28a, 28b; 28c, 28d are arranged on the opposite edges 23a, 23b; 24a, 24b of each coupling part 23, 24, via which extensions an articulated connection to one of the lamellae 11 through 14, 15 through 18, respectively, of the closure devices 10a, 10b takes place (see FIG. 1).

FIG. 6 is an exploded view of the actuation mechanism 20 according to the invention. This further illustrates the design of the two coupling parts 23, 24 and of the control element 25. As can be seen in combination with the illustrations in FIG. 4 and FIG. 5, the control element 25 has a total of two control pins 29, 30, of which the first control pin 29 is arranged on a side 25a, facing the first coupling element 23, of the control element 25, while the second control pin 30 is located on a side 25b, facing the second coupling element 24, of the control element 25. In this case, the control pins 29, 30, extending away from one another, are at the same distance from a longitudinal direction Y1 of the axis of rotation 26 of the control element 25, wherein said pins are located in a common plane with the axis of rotation 26.

It can also be seen that the control element 25 is formed, at least in regions, as a cam disk. For this purpose, the control element 25 has a curved outer edge R1 extending over approximately 180° about the axis of rotation 26. Opposite this, the control element 25 has an elevation 31 having a likewise curved outer edge R2. Both outer edges R1, R2 are more or less biconcavely curved in relation to one another. In the present case, a total of four drilled holes are arranged in the control element 25—in particular, in the region of the outer edge R1—which drilled holes can contribute to a weight reduction of the control element 25 due to the lack of material there.

With regard to the two coupling elements 23, 24, it is further clear that these each have a bearing groove 32, 33 which corresponds to the control pins 29, 30. In the completed state of the actuation mechanism 20, each of the two control pins 29, 30 engages, at least in part, in the associated bearing groove 32, 33 of the coupling parts 23, 24 (see, in particular, FIG. 4 and FIG. 5). The control pins 29, 30 and bearing grooves 32, 33 form a slide controller K, such that a movement or rotation of the control element 25 that takes place about the axis of rotation 26 can be converted into a corresponding linear shifting of the two coupling parts 23, 24 in relation to a shifting direction Z1 occurring in parallel with the vertical direction Z.

The bearing groove 32 arranged on the first coupling element 23, and the bearing groove 33 arranged on the second coupling element 24, each have a straight portion 32a, 33a and a curved portion 32b, 33b adjoining said straight portion. As can be seen, the two curved portions 32b, 33b are curved oppositely to one another. In addition, each coupling element 23, 24 has a guide groove 34, 35, respectively, which extends in parallel with the vertical direction Z or in parallel with the shifting direction Z1. The bearing grooves 32, 33 and the guide grooves 34, 35 of each coupling part 23, 24 are connected to one another in that the respective guide groove 34, 35 intersects with the associated bearing groove 32, 33. Specifically, the individual guide groove 34, 35 coincides with the associated bearing groove 32, 33 in the transition region thereof between the straight portion 32a, 33a thereof and the curved portion 32b, 33b thereof. In the completed state of the actuation mechanism 20, the axis portions 26a, 26b of the axis of rotation 26 of the control element 25 extend through the guide groove 34, 35 of the associated coupling part 23, 24, at least in part (see, in particular, FIG. 4 and FIG. 5). In addition, the two coupling parts 23, 24 each have a projection 36, 37, respectively, via which the respective coupling element 23, 24 can be supported on the corresponding outer edge R1, R2 of the control element 25, designed as a cam disk.

The lengths of the axis portions 26a, 26b of the axis of rotation 26 and of the control pins 29, 30 of the control element 25, which are excessive with respect to the illustration in FIGS. 4 and 5, are selected such that they always extend through the associated bearing grooves 32, 33 and guide grooves 34, 35, even in the case of a change in the distance between the two coupling elements 23, 24, transverse to the shifting direction Z1, occurring at the same time as the linear shifting of the coupling elements 23, 24, without the risk of slipping out.

FIG. 7 is a further perspective view of an isolated illustration of the control element 25. Compared to the illustration in FIG. 6, the control element 25 is rotated such that it is viewed from the other side 25a thereof, on which side the first control pin 29 is arranged.

Figure 8A:
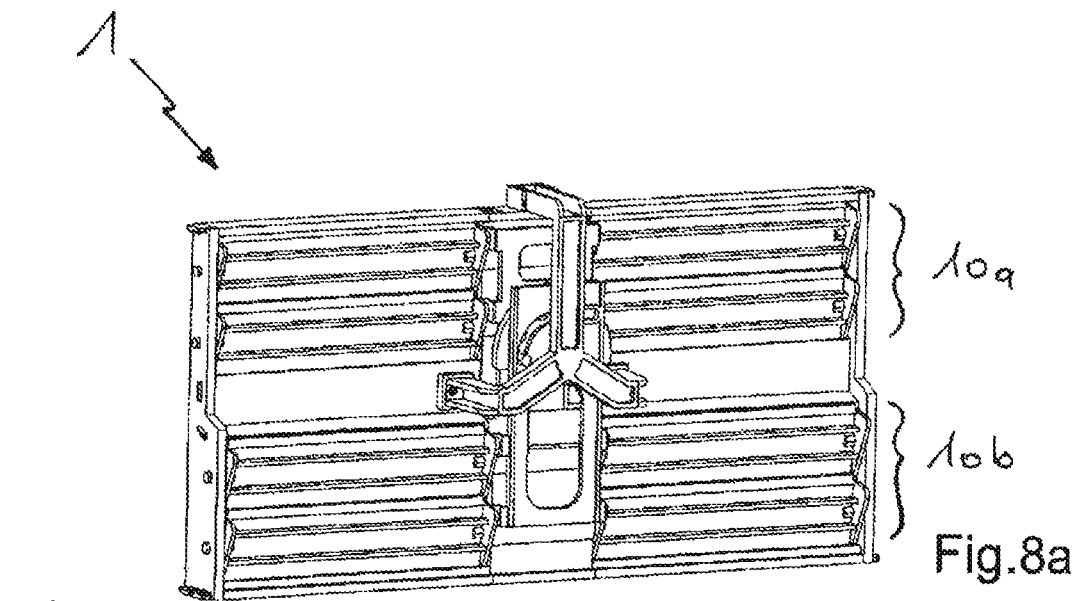
FIG. 8a shows the air flow control assembly from FIG. 1 through FIG. 3 in a first state.

FIGS. 8a through 8e illustrate the at least partially asynchronous actuation of the two closure devices 10a, 10b on the basis of a rotational movement of the control element 25 about the axis of rotation 26 thereof:

FIG. 8a shows the state in which the closure devices 10a, 10b are both closed. In this case, the position of the control element 25 corresponds to an orientation of the control element 25 in FIG. 7 rotated by 180° about the longitudinal direction Y1 of the axis of rotation 26. In other words, in this case, the outer edge R1 of the control element 25 is oriented upwards in relation to the vertical direction Z, while the edge R2 of the elevation 31 is oriented downwards. The following FIGS. 8b through 8e each show the state of the closure devices 10a, 10b which results from a rotation of the control element 25 of 45° in each case.

Figure 8B:
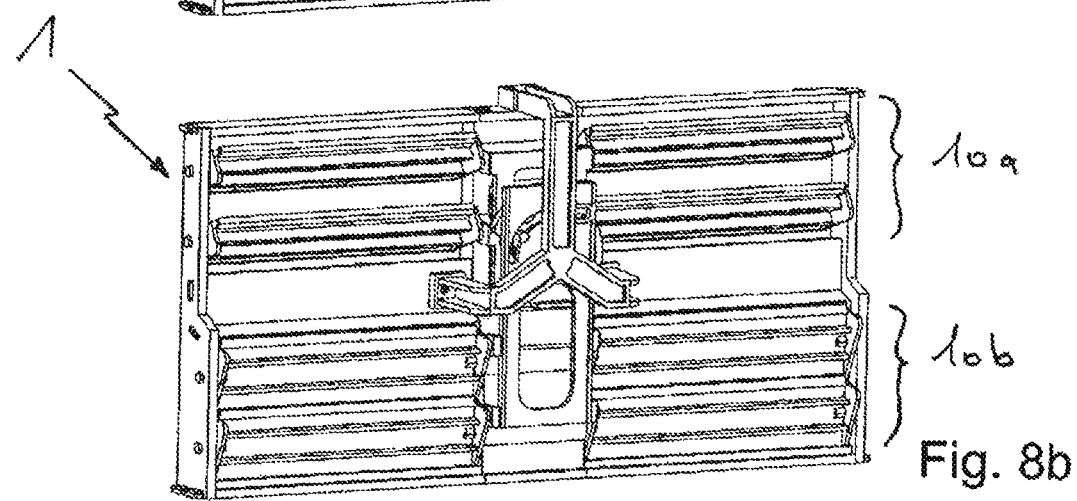
FIG. 8b shows the air flow control assembly from FIG. 8a in a second state, expanded with respect thereto.

FIG. 8b shows that a rotation of the control element of 45° in the clockwise direction causes a lowering of the first coupling part 23. As a result, the first closure device 10a is half opened, while the second closure device 10b remains closed. In the described configuration, the first control pin 29 is located within the straight portion 32a of the bearing groove 32 of the first coupling part 23, such that this is likewise shifted downwards (counter to the vertical direction Z), at least in part, by the first control pin 29 moving downwards about the axis of rotation 26.

Figure 8C:
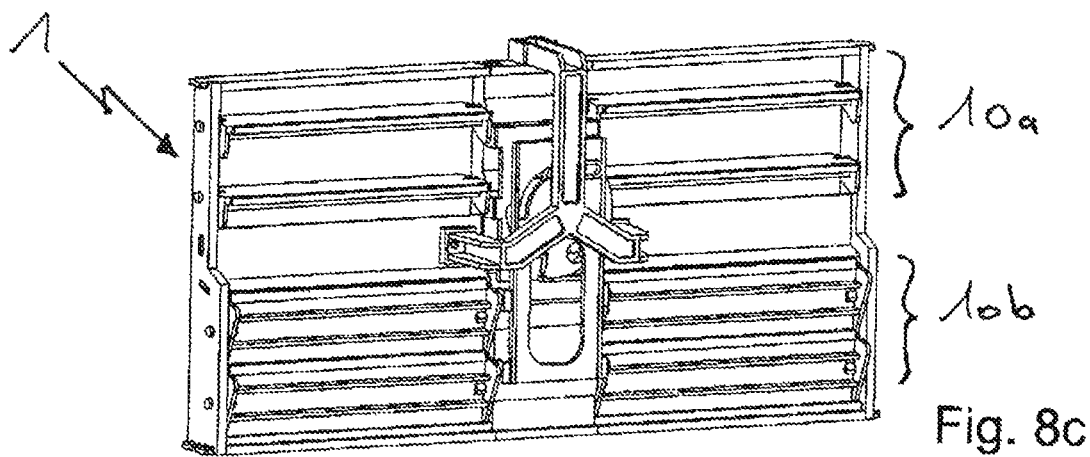
FIG. 8c shows the air flow control assembly of FIG. 8b in a third state, expanded with respect thereto.

FIG. 8c shows the now completely open first closure device 10a, which is based upon a rotation of the control element 25 which has now taken place of 90° in total.

During the rotation, the first control pin 29 was still located within the straight portion 32a of the bearing groove 32 of the first coupling part 23, such that this was shifted completely downwards (counter to the vertical direction Z).

During the previous rotation of the control element 25, the opposing second control pin 30 passed through the curved portion 33b of the bearing groove 33 of the second coupling part 24, such that this initially did not result in any shifting, which manipulates the second closure device 10b, for the second coupling part 24.

Figure 8D:
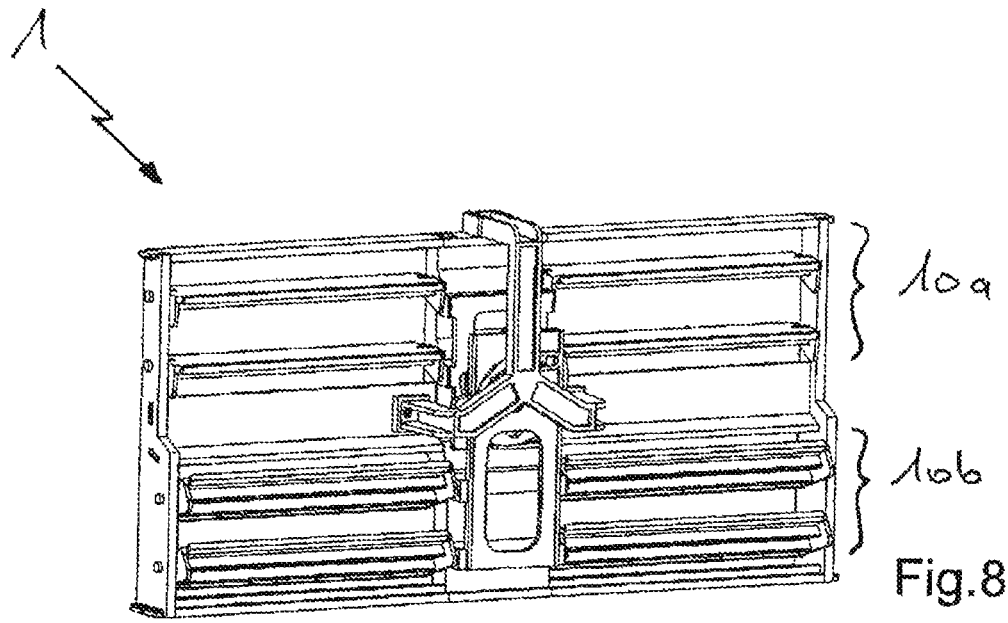
FIG. 8d shows the air flow control assembly of FIG. 8c in a fourth state, expanded with respect thereto.

FIG. 8d shows the beginning of the opening of the second closure device 10b, while the first closure device 10a still remains completely open. This is caused by a further rotation of the control element 25 of an additional 45°, such that this is now rotated a total of 135° out of its original position. Already in FIG. 8c, the second control pin 30 reached the transition region between the curved portion 33b and the straight portion 33a of the bearing groove 33 of the second coupling part 24, such that the latter reached the straight portion 33a during the further rotation. At the same time, the opposing first control pin 29 moved into the curved portion 32b of the associated bearing groove 32 of the first coupling part 23, such that it remained unchanged in its position, while the second coupling part 24 was shifted further downwards (counter to the vertical direction Z).

Figure 8E:
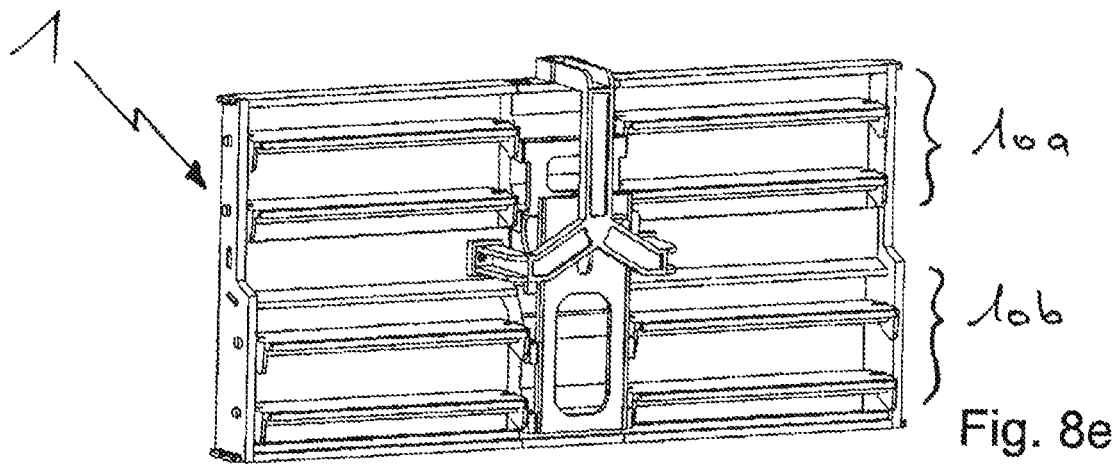
FIG. 8e shows the air flow control assembly from FIG. 8d in a fifth state, expanded with respect thereto.

FIG. 8e shows the completely open state of the two closure devices 10a, 10b. In this state, the control element 25 has performed a rotation of a total of 180°, while the first control pin 29 continued to pass through the curved portion 32b of the associated bearing groove 32 of the first coupling part 23, while the second control pin 30 continued to move through the straight portion 33a of the second coupling part 24. As a result, said second coupling part was shifted into its lowest position (counter to the vertical direction Z), while the first coupling part 23 remained in its previous position.

By means of a corresponding rotation of the control element 25 in the opposite direction, the previously described states can be passed through in the reverse order, such that, first of all, the second closure device 10b, and, then, the first closure device 10a, can be closed again.

Figure 9B:
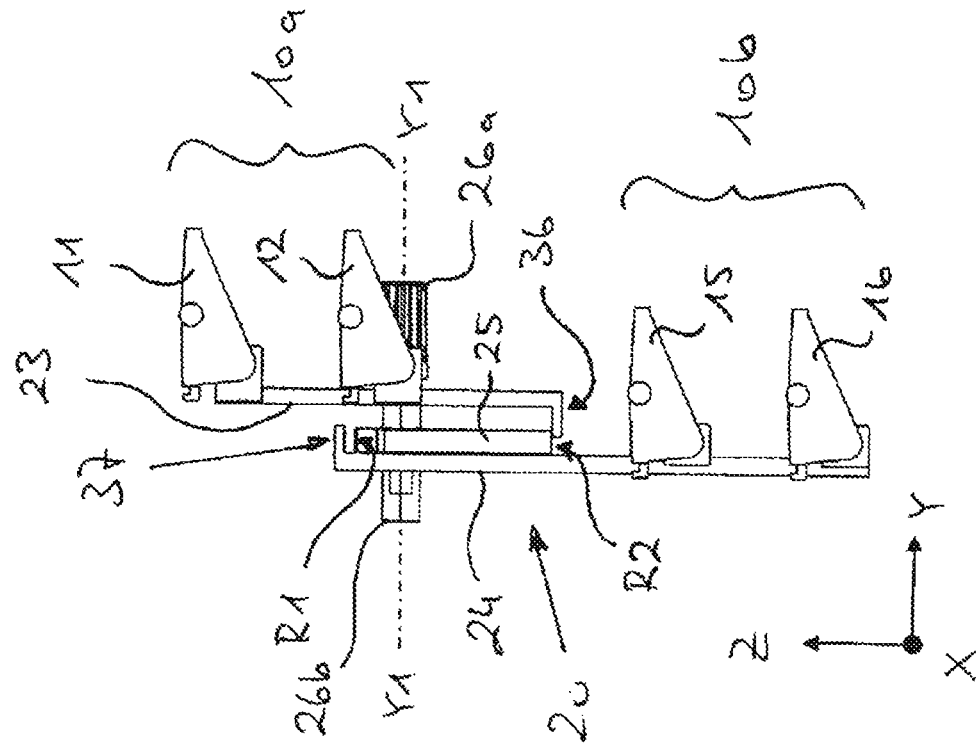
FIG. 9b is a cross-section through the actuation mechanism in the second state of the air flow control assembly.
Figure 9A:
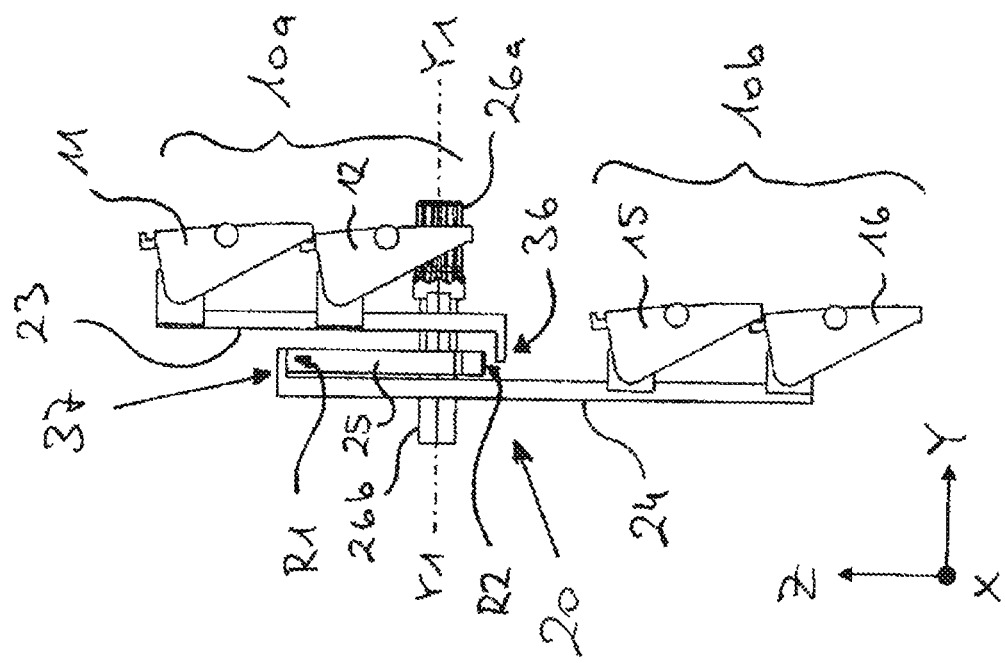
FIG. 9a is a cross-section through the actuation mechanism in the first state of the air flow control assembly.

FIGS. 9a and 9a show a cross-section through the actuation mechanism 20 in combination with the two closure devices 10a, 10b. FIG. 9a shows the state in which both closure devices 10a, 10b are completely closed. As can be seen, in this position, the second coupling part 24 is supported by its projection 37 on the edge R1 of the control element 25, while the projection 36 of the first coupling part 23 is spaced apart from the opposite edge R2 of the control element 25. In contrast, FIG. 9b shows the state in which both closure devices 10a, 10b are completely open. As can be seen, in this position, the first coupling part 23 is supported by its projection 36 on the edge R2 of the control element 25, while the projection 37 of the second coupling part 24 is now spaced apart from the opposite edge R1 of the control element 25. In both extreme states of the closure devices 10a, 10b, in this respect, in each case, one of the two coupling elements 23, 24 is supported via its associated projection 36, 37 on one of the edges R1, R2 of the control element 25 designed as a cam disk.

LIST OF REFERENCE NUMERALS

1—Air flow control assembly
2—Base frame of 1
3—First longitudinal profile of 2
3a—Longitudinal profile portion of 3
3b—Longitudinal profile portion of 3
4—Second longitudinal profile of 2
4a—Longitudinal profile portion of 4
4b—Longitudinal profile portion of 4
5—Side profile of 2
6—Side profile of 2
7—Center strut of 2
7a—Passage opening in 7
8a—Wall element of 2
8b—Wall element of 2
9a—First passage region of 2
9b—Second passage region of 2
10a—First closure device of 1
10b—Second closure device of 1
11—Lamella of 10a
12—Lamella of 10a
13—Lamella of 10a
14—Lamella of 10a
15—Lamella of 10b
16—Lamella of 10b
17—Lamella of 10b
18—Lamella of 10b
19—Retainer of 1
19a—First arm of 19
19b—Second arm of 19
19c—Third arm of 19
20—Actuation mechanism (of 1)
21—Actuator of 1 or 20
21a—Output of 21
22a—Base on 8a
22b—Base on 8b
22c—Base on 7
23—First coupling part of 20
23a—Edge of 23
23b—Edge of 23
24—Second coupling part of 20
24a—Edge of 24
24b—Edge of 24
25—Control element of 20

25a—First side of 25
25b—Second side of 25
26—Axis of rotation of 25
26a—First axis portion of 26
26b—Second axis portion of 26
27a—Extension of 23 on 23a
27b—Extension of 23 on 23a
27c—Extension of 23 on 23b
27d—Extension of 23 on 23b
28a—Extension of 24 on 24a
28b—Extension of 24 on 24a
28c—Extension of 24 on 24b
28d—Extension of 24 on 24b
29—First control pin of 25
30—Second control pin of 25
31—Elevation of 25
32—Bearing groove of 23
32a—Straight portion of 32
32b—Curved portion of 32
33a—Straight portion of 33
33b—Curved portion of 33
34—Guide groove of 23
35—Guide groove of 24
36—Protrusion of 23
37—Protrusion of 24
K—Slide controller
R1—Outer edge of 25
R2—Outer edge of 31
X—Longitudinal direction
Y—Transverse direction
Y1—Longitudinal direction of 26
Z—Vertical direction
Z1—Sliding direction

The invention claimed is:

1. An actuation mechanism (20) for at least partially asynchronously actuating two closure devices (10a, 10b) of an air flow control assembly (1) for a vehicle, comprising a control element (25) which is connectable to an actuator (21) and which is operatively connected via a first coupling part (23) provided for actuating the first closure device (10a) and via a second coupling part (24) provided for actuating the second closure device (10b), in such a way that a movement of the control element (25) occurring about an axis of rotation (26) is convertible into a shifting of the two coupling parts (23, 24) via a slide controller (K) having mutually corresponding control pins (29, 30) and bearing grooves (32, 33),
wherein the control element (25) having the control pins (29, 30) is integrated at least partially between the two coupling parts (23, 24) which are at least partially overlapping and are shiftable relative to the control element (25),
wherein the control pins (29, 30) engage at least partially into the bearing grooves (32, 33) positioned on the coupling parts (23, 24),
wherein the coupling parts (23, 24) which are shiftable linearly with respect to a shifting direction (Z1) each have a guide groove (34, 35) extending in parallel with the shifting direction (Z1),
wherein the axis of rotation (26) has two axis portions (26a, 26b) which are, respectively, each located on one of the sides (25a, 25b), facing away from one another, of the control element (25), and which point away from one another, each extending through the guide groove (34, 35) of the associated coupling part (23, 24), at least in portions.

2. The actuation mechanism (20) according to claim 1, wherein the control pins (29, 30) offset with respect to a longitudinal direction (Y1) of the axis of rotation (26) are arranged on sides (25a, 25b), facing away from one another, of the control element (25).

3. The actuation mechanism (20) according to claim 1, wherein the two control pins (29, 30) extend away from one another in a plane intersecting the axis of rotation (26) of the control element (25).

4. The actuation mechanism (20) according to claim 1, wherein the bearing groove (32, 33), designed for receiving a control pin (29, 30), of each coupling part (23, 24) has a straight portion (32a, 33a) and a curved portion (32b, 33b).

5. The actuation mechanism (20) according to claim 4, wherein the curved portion (32b) of the bearing groove (32) of the first coupling part (23) and the curved portion (33b) of the bearing groove (33) of the second coupling part (24) are curved opposingly to one another.

6. The actuation mechanism (20) according to claim 1, wherein the guide groove (34, 35) of each coupling element (23, 24) intersects the associated bearing groove (32, 33), in particular, in a transition region between a straight portion (32a, 33a) and a curved portion (32b, 33b) of the respective bearing groove (32, 33).

7. The actuation mechanism (20) according to claim 1, wherein the control element (25) has at least one cam disk or is designed as such at least in part, wherein at least one of the coupling elements (23, 24) has a projection (36, 37) via which the associated coupling element (23, 24) can be supported on an outer edge (R1, R2) of the cam disk.

8. The actuation mechanism (20) according to claim 1, wherein a length of the axis portions (26a, 26b) of the axis of rotation (26) and the control pins (29, 30) such that these extend through the associated bearing grooves (32, 33) and guide grooves (34, 35) even in the case of a change in the distance between the coupling elements (23, 24) transverse to the shifting direction (Z1) occurring at the same time as the linear shifting of the coupling elements (23, 24) in relation to the shifting direction (Z1).

9. The actuation mechanism (20) according to claim 1, wherein each coupling element (23, 24) has at least one extension (27a, 27b; 27c, 27d; 28a, 28b; 28c, 28d) on its opposing edges (23a, 23b; 24a, 24d), which extension is designed for articulated connection to a pivotable lamella (11-18), in each case, of the associated closure device (10a, 10b).

10. An air flow control assembly (1) for a vehicle, comprising two closure devices (10a, 10b) which are coupled to an actuation mechanism (20) for at least partially asynchronously actuating two closure devices (10a, 10b) of an air flow control assembly (1) for a vehicle, comprising a control element (25) which is connectable to an actuator (21) and which is operatively connected via a first coupling part (23) provided for actuating the first closure device (10a) and via a second coupling part (24) provided for actuating the second closure device (10b), in such a way that a movement of the control element (25) occurring about an axis of rotation (26) is convertible into a shifting of the two coupling parts (23, 24) via a slide controller (K) having mutually corresponding control pins (29, 30) and bearing grooves (32, 33),
wherein the control element (25) having the control pins (29, 30) is integrated at least partially between the two coupling parts (23, 24) which are at least partially overlapping and are shiftable relative to the control element (25), wherein the control pins (29, 30) engage at least partially into the bearing grooves (32, 33) positioned on the coupling parts (23, 24), wherein the coupling parts (23, 24) which are shiftable linearly with respect to a shifting direction (Z1) each have a guide groove (34, 35) extending in parallel with the shifting direction (Z1), wherein the axis of rotation (26) has two axis portions (26*a*, 26*b*) which are, respectively, each located on one of the sides (25*a*, 25*b*), facing away from one another, of the control element (25), and which point away from one another, each extending through the guide groove (34, 35) of the associated coupling part (23, 24), at least in portions.

11. The air flow control assembly (1) according to claim 10, wherein the closure devices (10*a*, 10*b*) are arranged in a base frame (2), wherein each closure device (10*a*, 10*b*) has at least one lamella (11-18) which is movably supported on the base frame (2), at least via one of its two end portions.

12. The air flow control assembly (1) according to claim 11, wherein the base frame (2) has a central strut (7) having an actuator (21) fixed thereto, wherein an output (21*a*) of the actuator (21) is connected in a torque-transmitting manner to an axis portion (26*a*) of the axis of rotation (26) of the control element (25) of the actuation mechanism (20).

13. The air flow control assembly (1) according to claim 11, wherein the base frame (2) is divided by at least one wall element (8*a*, 8*b*) into a first passage region (9*a*) having the first closure means (10*a*) and a second passage region (9*b*) having the second closure means (10*b*), wherein the at least one wall element (8*a*, 8*b*) extends between two opposing side profiles (5, 6) of the base frame (2) or extends from one of said side profiles (5, 6) to a central strut (7), located between the two side profiles (5, 6), of the base frame (2).

14. The air flow control assembly (1) according to claim 11, wherein an axis portion (26*b*), facing away from the actuator (21), of the axis of rotation (26) of the control element (25) of the actuation mechanism (20) is rotatably mounted on a retainer (19), wherein the retainer (19) is fixed to two wall elements (8*a*, 8*b*) and a central strut (7) of the base frame (2) via an arm (19*a*-19*c*) in each case.

\* \* \* \* \*